US012596982B2

(12) United States Patent
Nielsen et al.

(10) Patent No.: US 12,596,982 B2
(45) Date of Patent: Apr. 7, 2026

(54) SUSTAINABILITY RECOMMENDATIONS FOR HYDROCARBON OPERATIONS

(71) Applicant: Envana Software Solutions, LLC, Houston, TX (US)

(72) Inventors: Roxana Mehrabadi Nielsen, Spring, TX (US); Morgan Michelle Horbatko, Denver, CO (US); Emily Rees, Abingdon (GB)

(73) Assignee: Envana Software Solutions, LLC, Houston, TX (US)

( * ) Notice: Subject to any disclaimer, the term of this patent is extended or adjusted under 35 U.S.C. 154(b) by 268 days.

(21) Appl. No.: 17/730,605

(22) Filed: Apr. 27, 2022

(65) Prior Publication Data

US 2023/0351300 A1     Nov. 2, 2023

(51) Int. Cl.
G06Q 10/0637     (2023.01)
E21B 41/00     (2006.01)
E21B 47/12     (2012.01)

(52) U.S. Cl.
CPC ......... *G06Q 10/0637* (2013.01); *E21B 41/00* (2013.01); *E21B 47/12* (2013.01)

(58) Field of Classification Search
None
See application file for complete search history.

(56) References Cited

U.S. PATENT DOCUMENTS

| | | |
|---|---|---|
| 8,504,306 B2 | 8/2013 | Koch et al. |
| 9,551,981 B2 | 1/2017 | Bhageria et al. |
| 2011/0119113 A1 | 5/2011 | Chatterjee et al. |
| 2011/0168391 A1 | 7/2011 | Saleri et al. |
| 2012/0302470 A1 | 11/2012 | Pollard et al. |
| 2021/0019357 A1 | 1/2021 | Bennett et al. |

(Continued)

FOREIGN PATENT DOCUMENTS

| | | | |
|---|---|---|---|
| CA | 3106708 A1 | 12/2021 | |
| GB | 202005239 | 12/2021 | |
| WO | WO-2016094338 A1 * | 6/2016 | ............. E21B 43/26 |

OTHER PUBLICATIONS

Bin Liang et al, "Hydrocarbon production dynamics forecasting using machine learning: A state-of-the-art review," Fuel, vol. 337, 2023, pp. 1-13 (Year: 2023).*

(Continued)

*Primary Examiner* — Amanda Gurski
(74) *Attorney, Agent, or Firm* — Potomac Law Group, PLLC; Marc. S. Kaufman

(57) ABSTRACT

A system can receive a sustainability target for a level of assessment for a hydrocarbon operation. The system can receive actual data for an activity associated with the hydrocarbon operation. The system can generate a sustainability metric based on the actual data and one or more parameters of the activity. The system can generate, by at least one algorithm, a predicted sustainability state for the level of assessment at a subsequent point in time based on the sustainability metric, the actual data, and the one or more parameters of the activity. The system can generate a recommendation for at least one action based on the predicted sustainability state and the sustainability target for the hydrocarbon operation. The system can output the recommendation for the at least one action for adjusting the activity of the hydrocarbon operation.

14 Claims, 4 Drawing Sheets

(56) References Cited

U.S. PATENT DOCUMENTS

| | | | | |
|---|---|---|---|---|
| 2021/0388717 A1* | 12/2021 | Srinivasan | ............... | G06N 3/09 |
| 2023/0193754 A1* | 6/2023 | Bansal | .................. | E21B 49/087 |
| | | | | 703/1 |
| 2024/0384649 A1* | 11/2024 | Alghazal | .............. | E21B 47/117 |

OTHER PUBLICATIONS

International Search Report and Written Opinion, PCT/US2022/026488, Jan. 25, 2023, 10 pages.
Hasheminasab, et al., A Novel Metric of Sustainability for Petroleum Refinery Projects, Journal of Cleaner Production, vol. 171, pp. 1215-1224, Jan. 18, 2018.
International Preliminary Report on Patentability and Written Opinion of the International Searching Authority, cited in corresponding International Application No. PCT/US2022/026488 date mailed Jan. 25, 2023; 6 pages .
Extended European Search Report at the European Patent Office issued in European Patent Application No. 22940445.4-1218 PCT/US2022026488, dated Feb. 24, 2026; 7 pages.

* cited by examiner

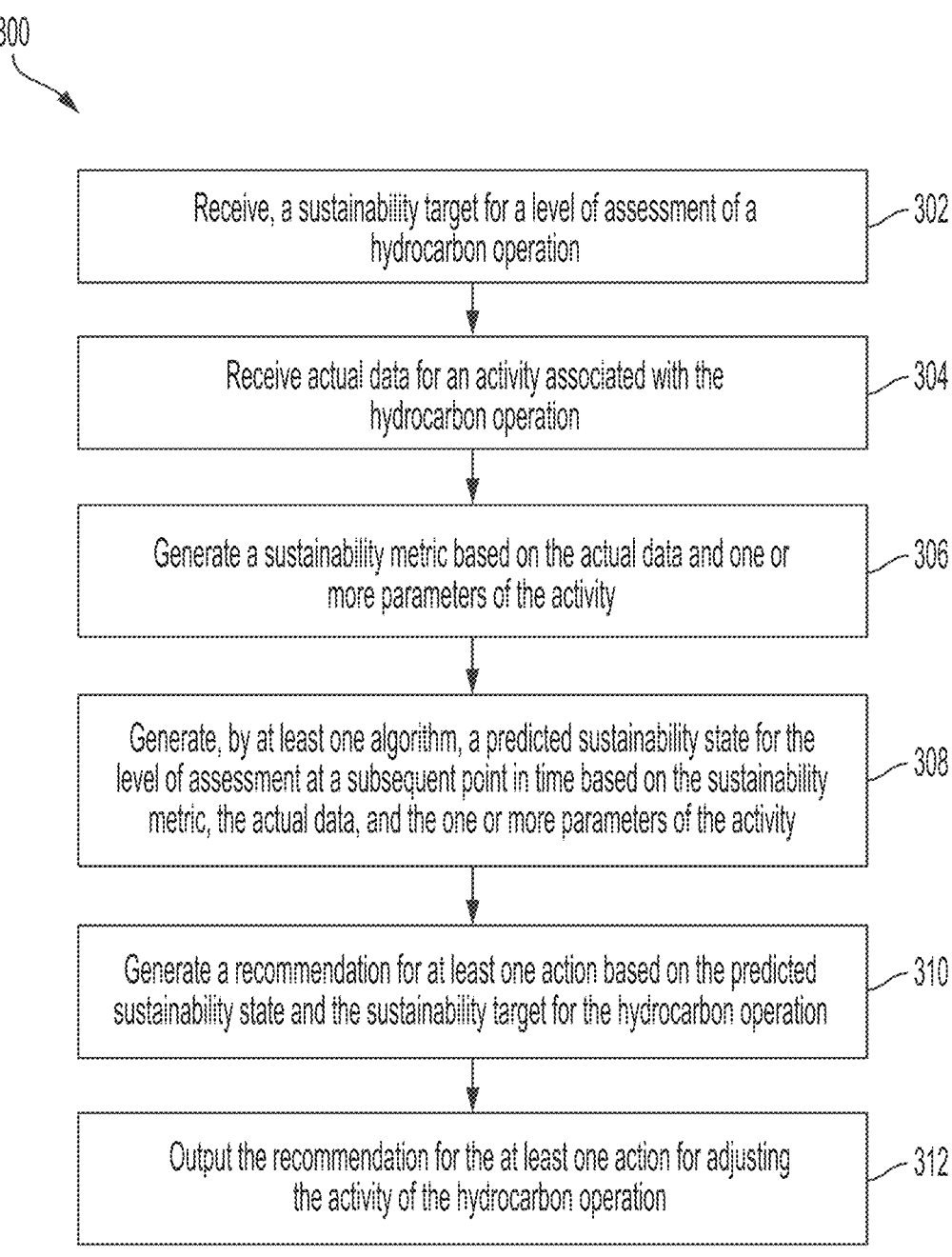

300

Receive, a sustainability target for a level of assessment of a hydrocarbon operation — 302

Receive actual data for an activity associated with the hydrocarbon operation — 304

Generate a sustainability metric based on the actual data and one or more parameters of the activity — 306

Generate, by at least one algorithm, a predicted sustainability state for the level of assessment at a subsequent point in time based on the sustainability metric, the actual data, and the one or more parameters of the activity — 308

Generate a recommendation for at least one action based on the predicted sustainability state and the sustainability target for the hydrocarbon operation — 310

Output the recommendation for the at least one action for adjusting the activity of the hydrocarbon operation — 312

FIG. 3

SUSTAINABILITY RECOMMENDATIONS FOR HYDROCARBON OPERATIONS

TECHNICAL FIELD

The present disclosure relates generally to hydrocarbon operations and, more particularly, although not necessarily exclusively, to sustainability recommendations for hydrocarbon operations.

BACKGROUND

Hydrocarbon exploration is the search for hydrocarbons, such as oil or gas, within a subterranean formation. Greenhouse gas emissions resulting from hydrocarbon operations can impact the environment. A high carbon footprint or other sustainability metric for a hydrocarbon exploration operation can indicate inefficient processes or areas of the hydrocarbon exploration operation involving excessive resources. Determining a carbon footprint for a hydrocarbon exploration operation may be difficult due to a large amount of data to be analyzed. Additionally, different equipment and services used during a hydrocarbon exploration operation or multiple hydrocarbon exploration operations may have a different impact on the emissions, so if the equipment or services are not known ahead of time, it may be difficult to determine the carbon footprint or other sustainability metrics. And, even if the sustainability metrics are determined, it is usually determined later than a time when adjustments can be made. Determining the sustainability metric earlier can prevent a high carbon footprint. Thus, understanding emissions and sustainability metrics for hydrocarbon exploration operations can provide significant value for efficient development of hydrocarbon resources.

BRIEF DESCRIPTION OF THE DRAWINGS

FIG. 3 is a flowchart of a process for generating sustainability recommendations for hydrocarbon operations according to one example of the present disclosure.

DETAILED DESCRIPTION

Figure 1:
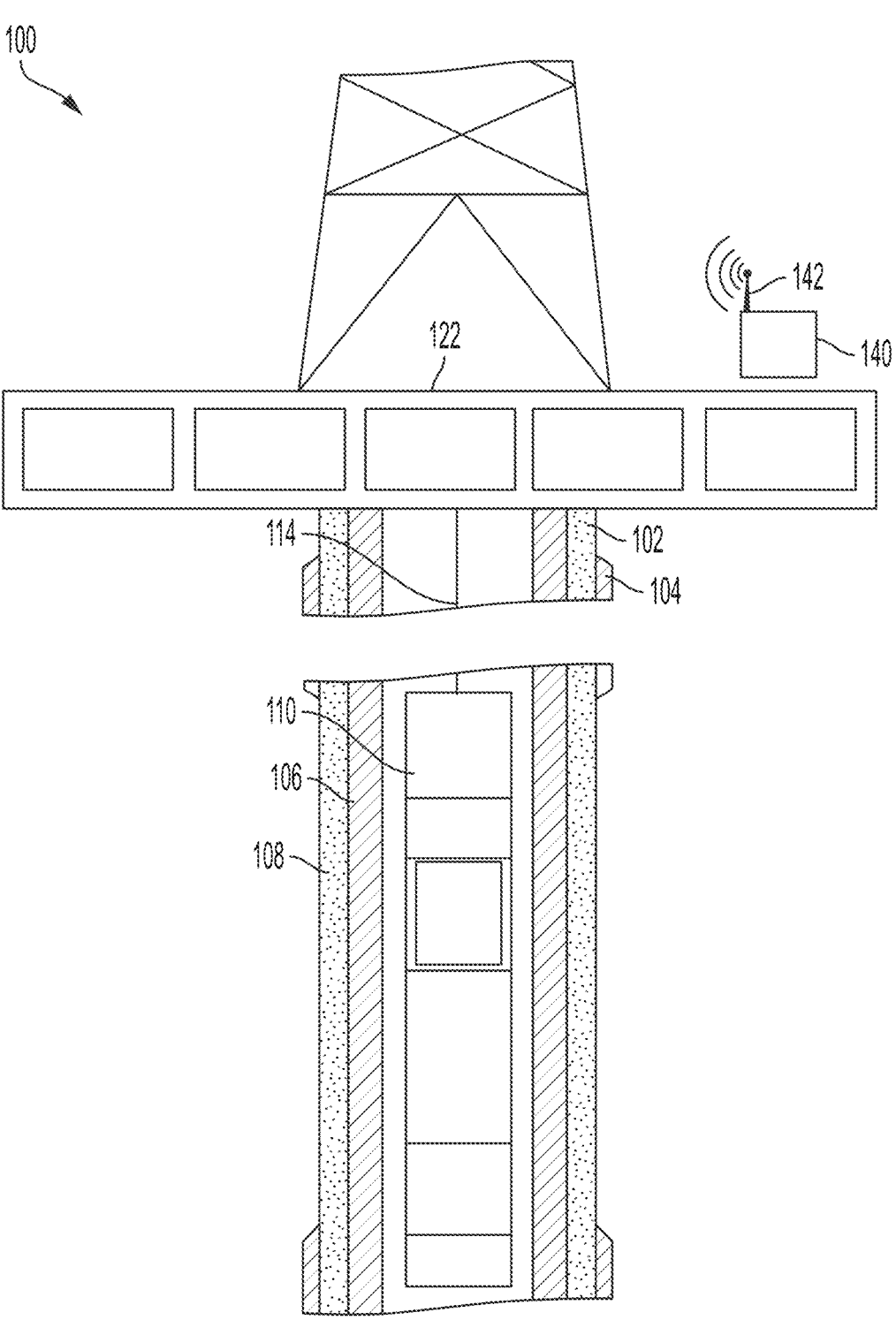
FIG. 1 a schematic of a well system associated with sustainability recommendations according to one example of the present disclosure.

Certain aspects and examples of the present disclosure relate to generating sustainability recommendations for a hydrocarbon operation to optimize a sustainability impact. The sustainability impact may include carbon emissions, water usage, or fuel consumption associated with the hydrocarbon operation. The hydrocarbon operation may be a wellbore operation, such as a drilling operation, a completion operation, or a production operation, or the hydrocarbon operation may be other hydrocarbon exploration operations. By using a system according to some examples, sustainability impacts can be estimated for overall asset management of a reservoir, Recommendations can be generated for actions that can be taken to align a predicted sustainability state with a sustainability target such that an environmental impact for a hydrocarbon operation can be reduced.

In some aspects, a system can facilitate decision making towards meeting environmental, social, and governance (ESG) related targets for hydrocarbon operations. The system can include an application that provides a forecast of selected sustainability metrics into the future towards a selected goal. The application can also provide recommendations. The system can use historical and actual data, including potential public datasets such as weather conditions, or other publicly available datasets, as inputs to algorithms that can provide the forward forecast. The system can then offer options for how to meet the relevant sustainability target by recommending activity or equipment changes and associated costs or performance trade-offs associated with the recommended changes.

The ingestion of historical and actual data to train algorithms can result in accurate forecasts. Additionally, the algorithms can relate actions previously taken to sustainability impacts, so that forward-looking recommendations can be provided with insights in how the recommendations can improve alignment to sustainability targets. In addition, the system can include a feedback mechanism. So, once modifications have been made in alignment with the recommendations, recorded changes to sustainability performance can be indicated in collected data and fed back into the algorithms to continually refine and improve the forecasts. In this way, a user can have an accurate view of how close a hydrocarbon operation is to reaching the sustainability targets, and what investment can be made to reach the sustainability targets. In addition, an efficacy of the changes can also be monitored.

Aspects of the present disclosure relate to a system that receives a sustainability target for a level of assessment for a hydrocarbon operation. The sustainability target may be an emissions or resource usage target that is to be satisfied by a particular point in time. The level of assessment may be a particular well, an asset, a region, or an entity portfolio. The system can receive actual data for an activity associated with the hydrocarbon operation and generate a sustainability metric for the activity based on the actual data and parameters of the activity. Examples of the parameters can include equipment or energy sources that are to be used during the hydrocarbon operation. Examples of the sustainability metric may include an amount of carbon emissions or a cost associated with the hydrocarbon operation. The system can then generated a predicted sustainability state for the level of assessment at the particular point in time based on the sustainability metric, the actual data, and the parameters. If the predicted sustainability state exceeds the sustainability target, the system can generate a recommendation for at least one action that can be taken to reduce the predicted sustainability state. The action can be an adjustment to the parameters of the activity. The system can then output the recommendation and receive a selection of an action of the recommendation that is to be performed for the activity.

As a particular example, the activity may be a drilling operation for a wellbore. An entity associated with the drilling operation may have a sustainability target of reducing emissions by 10% in a region associated with the wellbore in the next five years. The system can receive data indicating fuel use associated with a previous drilling operation in the region of a similar offset well. Based on the fuel use for the drilling operation, the system can determine that the region is expected to have a predicted sustainability state that exceeds the sustainability target in five years. The system can then generate recommendations of changes of drilling fluids, well designs, or other drilling conditions that are expected to result in a predicted sustainability state that satisfies the sustainability target in five years. The system can output the recommendations to a user that can provide a selection of one or more of the changes. The system can then implement the changes and continue monitoring data collected for the drilling operation, and other hydrocarbon operations in the region, to generate additional recommendations to align the predicted sustainability state with the sustainability target for the region.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 a schematic of a well system 100 associated with sustainability recommendations according to one example of the present disclosure. The well system 100 can include a wellbore 102 extending through various earth strata. The wellbore 102 can extend through a subterranean formation 104 that can include hydrocarbon material such as oil, gas, coal, or other suitable material. In some examples, a casing string 106 can extend from a well surface 122 into the subterranean formation 104. The casing string 106 can provide a conduit through which formation fluids, such as production fluids produced from the subterranean formation 104, can travel to the well surface 122. The casing string 106 can be coupled to walls of the wellbore 102 via cement or other suitable coupling material. For example, a cement sheath 108 can be positioned or formed between the casing string 106 and the walls of the wellbore 102 for coupling the casing string 106 to the wellbore 102. The casing string 106 can be coupled to the wellbore 102 using other suitable techniques.

The well system 100 can include at least one well tool, such as a well tool 110. The well tool 110 can be coupled to a wireline 114, a slickline, or a coiled tube that can be deployed into the wellbore 102. The wireline 114, the slickline, or the coiled tube can be guided into the wellbore 102 using, for example, a guide or winch. In some examples, the wireline 114, the slickline, or the coiled tube can be unwound from around a reel to be deployed into the wellbore 102.

A computing device 140 can be positioned at the surface 122 of the well system 100. In some examples, the computing device 140 can be positioned downhole in the wellbore 102, remote from the well system 100, or in other suitable locations with respect to the well system 100. The computing device 140 can be communicatively coupled to the well tool 110 or other suitable components of the well system 100 via a wired or wireless connections. For example, as illustrated in FIG. 1, the computing device 140 can include an antenna 142 that can allow the computing device 140 to receive and to send communications relating to the well system 100. The computing device 140 may be in communication with another computing device, such as the computing device 200 in FIG. 2, and can receive commands to adjust aspects of the well system 100 based on a determined sustainability recommendations associated with the well system 100. For example, the commands may adjust equipment usage or other aspects for the well system 100.

Although FIG. 1 is shown as a completion environment, the well system 100 may alternatively be associated with a drilling operation, a fracturing operation, or a production operation. In each hydrocarbon operation, the computing device 140 may receive commands to adjust the operation based on the predicted sustainability outcome.

Figure 2:
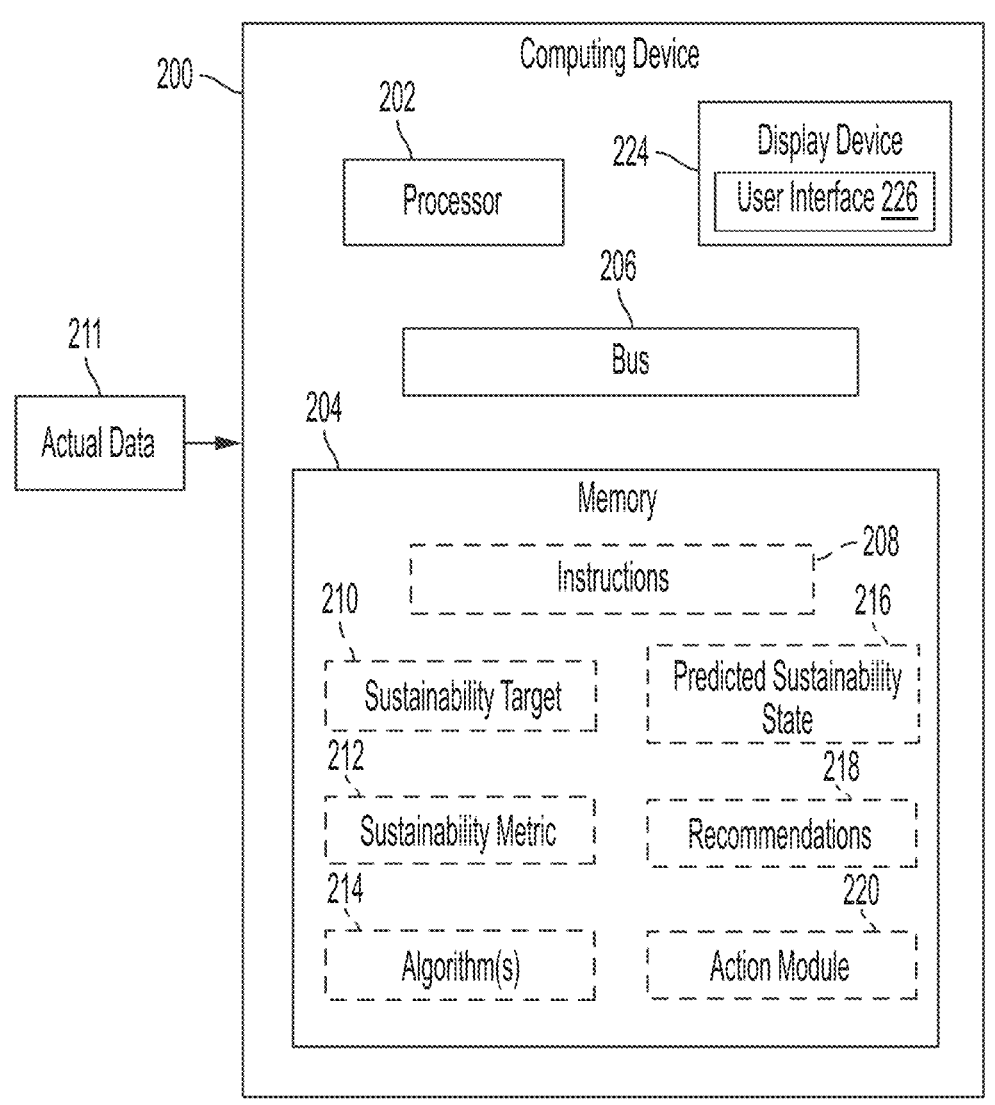
FIG. 2 is a block diagram of an example of a computing device for implementing sustainability recommendations for hydrocarbon operations according to one example of the present disclosure.

FIG. 2 is a block diagram of an example of a computing device 200 for implementing sustainability recommendations for hydrocarbon operations according to one example of the present disclosure. The hydrocarbon operations may be drilling operations, fracturing operations, completion operations, production operations, other hydrocarbon exploration operations, or a combination thereof. The computing device 200 can include a processor 202, a bus 206, a memory 204, and a display device 224. In some examples, the components shown in FIG. 2 can be integrated into a single structure. For example, the components can be within a single housing with a single processing device. In other examples, the components shown in FIG. 2 can be distributed (e.g., in separate housings) and in electrical communication with each other using various processors. It is also possible for the components to be distributed in a cloud computing system or grid computing system.

The processor 202 can execute one or more operations for generating sustainability recommendations for a hydrocarbon operation. The processor 202 can execute instructions 208 stored in the memory 204 to perform the operations. The processor 202 can include one processing device or multiple processing devices. Non-limiting examples of the processor 202 include a field-programmable gate array ("FPGA"), an application-specific integrated circuit (ASIC"), a processor, a microprocessor, etc.

The processor 202 is communicatively coupled to the memory 204 via the bus 206. The memory 204 may include any type of memory device that retains stored information when powered off, Non-limiting examples of the memory 204 include electrically erasable and programmable read-only memory ("EEPROM"), flash memory, or any other type of non-volatile memory. In some examples, at least some of the memory 204 can include a non-transitory medium from which the processor 202 can read instructions. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the computing device 200 includes a display device 224. The display device 224 can represent one or more components used to output data. Examples of the display device 224 can include a liquid-crystal display (LCD), a computer monitor, a touch-screen display, etc. The display device 224 can include a user interface 226 for receiving inputs and displaying outputs associated with the hydrocarbon operation.

The computing device 200 may include a sustainability target 210 for a hydrocarbon operation. The computing device 200 may receive the sustainability target 210 as input from a user associated with the hydrocarbon operation. The sustainability target 210 may be set for a desired level of assessment, forecast, or review. For example, a level of assessment for the hydrocarbon operation could include, but is not limited to, sustainability targets for specific wells, assets, regions, or entity portfolios. Examples of the sustainability target 210 may be an emissions limit, a water usage limit, a fuel consumption limit, etc. In addition, the sustainability target 210 may be a percentage reduction from a baseline sustainability value. The sustainability target 210 can be associated with a particular point in time. For instance, the sustainability target 210 may be a 10% reduction in emissions in the next ten years.

The computing device 200 can receive actual data 211 for an activity associated with the hydrocarbon operation. Initially the actual data 211 may be historical data collected for a similar activity. The computing device 200 may receive the actual data 211 as an input from the user, or the computing device 200 may access a database that stores the actual data 211. The actual data 211 can be determined by the activity being modelled, and could include, but is not limited to, collected data on equipment usage hours, fuel consumption, logistics movements, well design parameters, production statistics, completions parameters, water usage, and waste statistics. The activity may be one or more stages of the hydrocarbon operation. For example, the activity may be a drilling operation, cementing operation, completion operation, fracturing operation, perforation operation, production operation, or a combination thereof.

In some examples, the computing device 200 can generate a sustainability metric 212 based on the actual data 211 and one or more parameters of the activity. As an example, the sustainability metric 212 may be an amount carbon dioxide emissions for the activity or a water usage for the activity in a particular time period, such as an hour or a day. The parameters can involve types of energy sources and equipment used during the activity. For example, the parameters may involve use of grid power, dual fuel generators or engines, natural gas or field gas generators, or types of diesel engines. The computing device 200 can generate the sustainability metric 212 by analyzing the actual data 211 and the one or more parameters of the activity with respect to a common sustainability factor. For example, the computing device 200 can translate an equipment run time or fuel use, indicated in the actual data 211, to carbon dioxide equivalent emissions factors.

The computing device 200 can execute algorithm(s) 214 to generate a predicted sustainability state 216 at a subsequent point in time based on the sustainability metric 212, the actual data 211, and the parameters of the activity. The predicted sustainability state 216 may be a total greenhouse gas emissions in a defined time period, a total water use in the defined time period, or a total chemical wastage in the defined time period. The defined period of time can be a period of time between a current time and the subsequent point in time. In addition, the subsequent point in time can correspond to the particular point in time that is associated with the sustainability target 210.

The algorithm(s) 214 can be forecasting algorithms for determining the predicted sustainability state 216. In some examples, the algorithm(s) 214 may be machine-learning models that receive the actual data 211, the sustainability metric 212, and the parameters as inputs. The algorithm(s) 214 may additionally receive other features of the activity as inputs, such as environmental conditions associated with the activity. The machine-learning models can be trained with training data that includes historical data and known sustainability states associated with the historical data for past hydrocarbon operations.

Upon determining the predicted sustainability state 216, the computing device 200 can generate a comparison between the predicted sustainability state 216 and the sustainability target 210. The comparison can provide insight about how the activity impacts reaching the sustainability target 210. If the comparison indicates that the predicted sustainability state 216 meets the sustainability target 210, the computing device 200 may generate an output indicating that the activity and the parameters of the activity are satisfactory for meeting the sustainability target 210.

Alternatively, if the comparison indicates that the predicted sustainability state 216 does not meet the sustainability target 210, the computing device 200 can generate recommendations 218 for at least one action based on the predicted sustainability state 216 and the sustainability target 210 for the hydrocarbon operation. The actions can be adjustments to the parameters of the activity. The computing device 200 can use a machine-learning model to determine the recommendations 218. The recommendations 218 may be based on the sustainability metric 212 for the hydrocarbon operation. For example, the sustainability metric 212 may be emissions or cost, so the recommendations 218 can be adjustments of the parameters that minimize the emissions or the cost. Training data can be used to train a machine learning network for generating the recommendations 218. In an example, the training data can be historical data associated with parameters and resulting sustainability metrics for hydrocarbon operations.

The computing device 200 may generate and output multiple recommendations 218 that a user can compare. Each of the recommendations 218 can include indications of an associated impact of each recommended action on the predicted sustainability state 216, an associated uncertainty value for the predicted sustainability state 216 for each recommended action, or a contribution of each parameter of the activity to the predicted sustainability state 216. For example, a recommendation may indicate that the engine contributes the most to the predicted sustainability state 216 and that switching from a first type of engine to a second type of engine for a drilling operation can reduce the emissions by 2%±0.3%.

A user may then select a recommendation of the recommendations 218 for the hydrocarbon operation. The user may select the recommendation that is indicated as having the best impact on the predicted sustainability state 216. That is, the user may select the recommendation that is predicted to result in the predicted sustainability state 216 aligning the closest with the sustainability target 210. Alternatively, the user may select a recommendation for a different reason. The computing device 200 can receive the selection of the recommendation. In some examples, the computing device 200 may receive a selection of multiple actions.

Based on the selection, the computing device 200 can perform the action for the hydrocarbon operation. Alternatively, the computing device 200 may perform the action for the hydrocarbon operation without user input. The computing device 200 may send a command for making the adjustments associated with the action, or may output an indication to the user to make the adjustments. In some examples, the computing device 200 can include an action module 220 that can take the recommendations 218 and apply them to some other process. For example, the computing device 200 can use the recommendations 218 to control a well drilling operation, a well completion operation, a well production operation, or some other process relevant to the hydrocarbon operation. The action module

218 may adjust the parameters of the hydrocarbon operation based on the recommendations 218 to control the hydrocarbon operation. The action module 220 can apply the recommendations 218 to develop a plan for drilling operations, completion operations, or production operations.

In response to performing the action, the computing device 200 can receive real-time data for the activity. The real-time data can correspond to the actual data 211 for the activity as the activity is being performed. As the computing device 200 receives the real-time data, the computing device 200 can generate an updated sustainability metric based on the real-time data and the parameters of the activity. The computing device 200 can then generate an updated predicted sustainability state for the level of assessment at the subsequent point in time based on the updated sustainability metric, the real-time data, and the parameters of the activity. As a result, the computing device 200 can continue determining recommendations 218 for actions that can align the updated predicted sustainability state with the sustainability target throughout the activity being performed.

Figure 4:
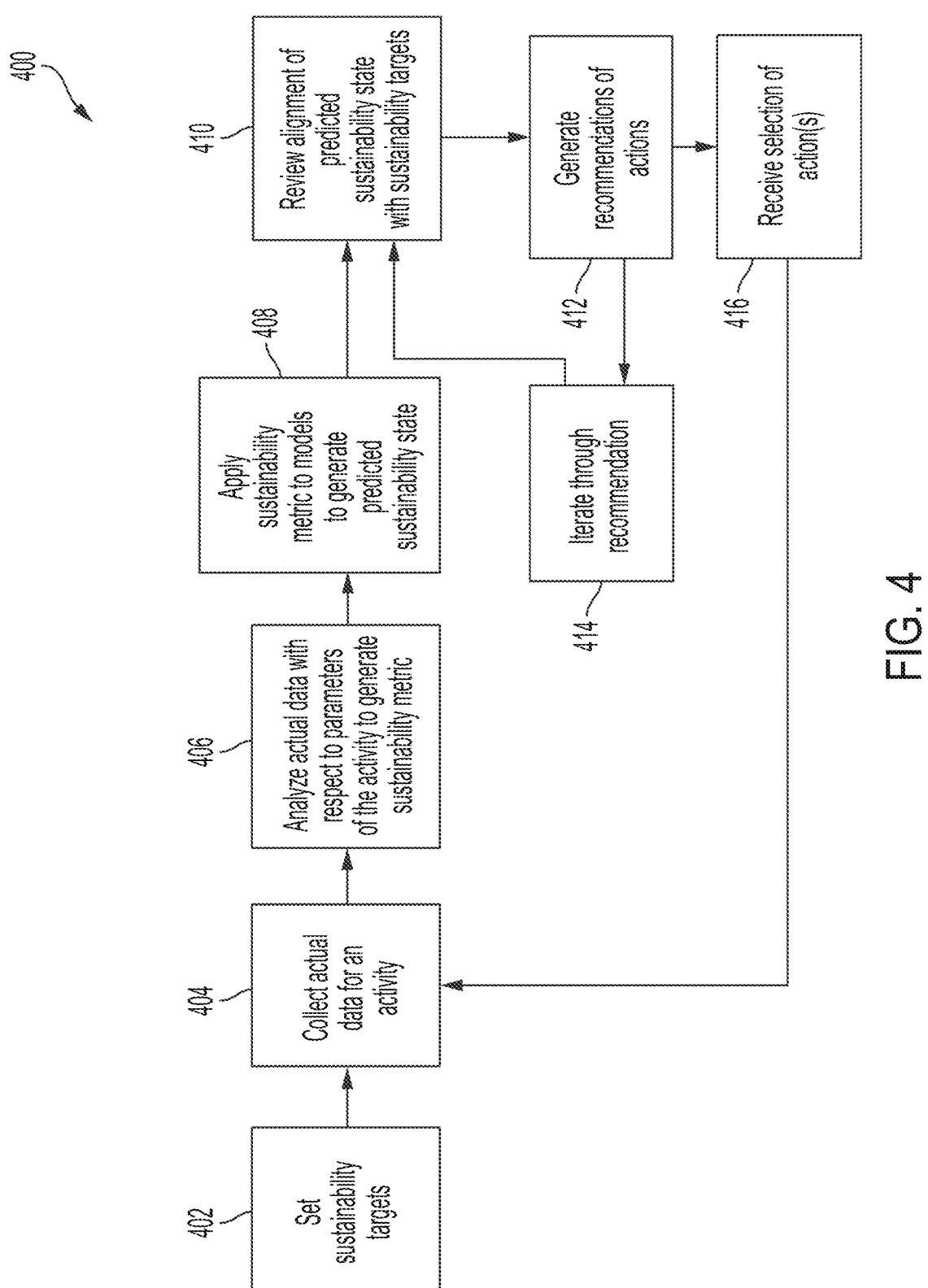
FIG. 4 is another flowchart of a process for generating sustainability recommendations for hydrocarbon operations according to one example of the present disclosure.

In some examples, the computing device 200 can implement process 300 or process 400 shown in FIGS. 3-4 for effectuating some aspects of the present disclosure. Other examples can involve more operations, fewer operations, different operations, or a different order of the operations shown in FIGS. 3-4. The operations of FIGS. 3-4 are described below with reference to the components shown in FIG. 2.

FIG. 3 is a diagram of a process 300 for generating sustainability recommendations for hydrocarbon operations according to one example of the present disclosure. In block 302, the processor 202 can receive a sustainability target 210 for a level of assessment for a hydrocarbon operation. The sustainability target 210 may be a goal for emissions, fuel consumption, water usage, or another suitable sustainability target. The level of assessment can be a well level, an asset level, a region level, or an entity portfolio level.

In block 304, the processor 202 can receive actual data 211 for an activity associated with the hydrocarbon operation. The actual data 211 may be historical data from a similar activity, or the actual data 211 may be real-time data collected during the activity, which may be one or more stages of the hydrocarbon operation. Examples of the actual data 211 can include equipment usage hours, fuel consumption, logistics movements, well design parameters, production statistics, completions parameters, water usage, and waste statistics.

In block 306, the processor 202 can generate a sustainability metric 212 based on the actual data 211 and one or more parameters of the activity. The sustainability metric 212 may be an amount carbon dioxide emissions for the activity or a water usage for the activity. Examples of the parameters can include types of energy sources and equipment used during the activity.

In block 308, the processor 202 can generate, by at least one algorithm 214, a predicted sustainability state 216 for the level of assessment at a subsequent point in time, which can correspond to the point in time in which the sustainability target 210 is to be met. The at least one algorithm 214 can generate the predicted sustainability state 216 based on the sustainability metric 212, the actual data 211, and the one or more parameters of the activity. Examples of the predicted sustainability state 216 can include a total greenhouse gas emissions in a defined time period, a total water use in the defined time period, or a total chemical wastage in the defined time period.

In block 310, the processor 202 can generate a recommendation 218 for at least one action based on the predicted sustainability state 216 and the sustainability target 210 for the hydrocarbon operation. The recommendation 218 can be recommendations for actions that result in the predicted sustainability state 216 aligning with the sustainability target 210. As an example, the processor 202 may generate a recommendation 218 of using 49% grid power, 28% tier 4 diesel engines, and 23% tier 2 diesel engines for the hydrocarbon operation to achieve the sustainability target 210 for the hydrocarbon operation.

In block 312, the processor 202 can output the recommendation 218 for the at least one action for adjusting the activity of the hydrocarbon operation. The processor 202 can output the recommendation 218 to a user interface 226 of a display device 224. The user can provide a selection of one or more actions of the recommendation 218, and the processor 202 can perform the one or more actions for the hydrocarbon operations, such as by implementing adjustments to the hydrocarbon operation to align the parameters of the activity with the selected actions. The processor 202 can continue receiving actual data 211 for the activity after the actions have been performed. So, the processor 202 can continually update the sustainability metric 212, the predicted sustainability state 216, and the recommendations 218 so that the level of assessment can maintain a trajectory to satisfy with the sustainability target 210 at the subsequent point in time.

FIG. 4 is another flowchart of a process 400 for generating sustainability recommendations for hydrocarbon operations according to one example of the present disclosure. In block 402, the processor 202 can set sustainability target(s) 210. The sustainability targets 210 can be emissions targets or resource consumption targets that are to be satisfied by a particular point in time.

In block 404, the processor 202 can collect actual data 211 for an activity. The actual data 211 may be collected from sensors or other equipment associated with a hydrocarbon operation that includes the activity.

In block 406, the processor 202 can analyze the actual data 211 with respect to parameters of the activity to generate a sustainability metric 212. Since the sustainability metric 212 is generated based on actual data 211, the sustainability metric 212 may be more accurate than if the sustainability metric 212 was generated based on forecasted data for the hydrocarbon operation.

In block 408, the processor 202 can apply the sustainability metric 212 to models to generate a predicted sustainability state 216. The predicted sustainability state 216 may correspond to a prediction of the sustainability metric 212 at the particular point in time of the sustainability target 210. The models may be machine-learning models trained to predict sustainability states for hydrocarbon operations.

In block 410, the processor 202 reviews an alignment of the predicted sustainability state 216 with the sustainability targets 210. If the processor 202 determines that the predicted sustainability state 216 aligns with the sustainability targets 210, the processor 202 may output an indication of the alignment and stop additional processing. Alternatively, if the processor 202 determines that the predicted sustainability state 216 exceeds, or otherwise does not align, with the sustainability targets 210, the processor 202 may continue to block 412.

In block 412, the processor 202 can generate recommendations 218 of actions. The actions can be actions predicted to align the predicted sustainability state 216 with the sustainability targets 210. The recommendations 218 can also include indications of an associated impact of each action on the predicted sustainability state 216, an associated uncertainty value for the predicted sustainability state 216 for each action, or a contribution of each parameter of the activity to the predicted sustainability state 216.

In block 414, the processor 202 can iterate through the recommendations 218. The processor 202 may output the recommendations 218 to a user, and the user can visualize the differences between the recommendations 218 and the impact of each on the predicted sustainability state 216. For each recommendation, the processor 202 can review the alignment of the predicted sustainability state 216 with the recommended action implemented to the sustainability targets 210.

In block 416, the processor 202 can receive a selection of actions) of the recommendations 218. The user can provide the selection to the processor 202 and the processor 202 can implement the action(s) for the activity. The processor 202 can then return to block 404 to continue collecting the actual data 211 and generating additional recommendations for the activity.

In some aspects, a system, a method, or a non-transitory computer-readable medium for generating sustainability recommendations for hydrocarbon operations according to one or more of the following examples:

As used below, any reference to a series of examples is to be understood as a reference to each of those examples disjunctively (e.g., "Examples 1-4" is to be understood as "Examples 1, 2, 3, or 4").

A system comprising: a processing device; and a memory device that includes instructions executable by the processing device for causing the processing device to: receive a sustainability target for a level of assessment for a hydrocarbon operation; receive actual data for an activity associated with the hydrocarbon operation; generate a sustainability metric based on the actual data and one or more parameters of the activity; generate, by at least one algorithm, a predicted sustainability state for the level of assessment at a subsequent point in time based on the sustainability metric, the actual data, and the one or more parameters of the activity; generate a recommendation for at least one action based on the predicted sustainability state and the sustainability target for the hydrocarbon operation; and output the recommendation for the at least one action for adjusting the activity of the hydrocarbon operation.

Example 2 is the system of example 1, wherein the memory device further includes instructions executable by the processing device for causing the processing device to: receive a selection of an action of the at least one action; and perform the action for the hydrocarbon operation.

Example 3 is the system of example 2, wherein the memory device further includes instructions executable by the processing device for causing the processing device to: in response to performing the action for the hydrocarbon operation, receive real-time data associated with the action; generate an updated sustainability metric based on the real-time data and the one or more parameters of the activity; and generate an updated predicted sustainability state for the level of assessment at the subsequent point in time based on the updated sustainability metric, the real-time data, and the one or more parameters of the activity.

Example 4 is the system of example(s) 1-3, wherein the memory device further includes instructions executable by the processing device for causing the processing device to generate the sustainability metric by: analyzing the actual data and the one or more parameters of the activity with respect to a common sustainability factor.

Example 5 is the system of example(s) 4, wherein the memory device further includes instructions executable by the processing device for causing the processing device to: prior to generating the recommendation, generate a comparison between the sustainability metric and the predicted sustainability state at the subsequent point in time.

Example 6 is the system of example(s) 1-5, wherein the predicted sustainability state comprises a total greenhouse gas emissions in a defined time period, a total water use in the defined time period, or a total chemical wastage in the defined time period.

Example 7 is the system of example(s) 1-6, wherein the recommendation for the at least one action comprises indications of an associated impact of each action of the at least one action on the predicted sustainability state, an associated uncertainty value for the predicted sustainability state for each action of the at least one action, or a contribution of each parameter of the one or more parameters of the activity to the predicted sustainability state.

Example 8 is a method, comprising: receiving a sustainability target for a level of assessment for a hydrocarbon operation; receiving actual data for an activity associated with the hydrocarbon operation; generating a sustainability metric based on the actual data and one or more parameters of the activity; generating, by at least one algorithm, a predicted sustainability state for the level of assessment at a subsequent point in time based on the sustainability metric, the actual data, and the one or more parameters of the activity; generating a recommendation for at least one action based on the predicted sustainability state and the sustainability target for the hydrocarbon operation; and outputting the recommendation for the at least one action for adjusting the activity of the hydrocarbon operation.

Example 9 is the method of example 8, further comprising: receiving a selection of an action of the at least one action; and performing the action for the hydrocarbon operation.

Example 10 is the method of example 9, further comprising: in response to performing the action for the hydrocarbon operation, receiving real-time data associated with the action; generating an updated sustainability metric based on the real-time data and the one or more parameters of the activity; and generating an updated predicted sustainability state for the level of assessment at the subsequent point in time based on the updated sustainability metric, the real-time data, and the one or more parameters of the activity.

Example 11 is the method of example(s) 8-10, wherein generating the sustainability metric comprises: analyzing the actual data and the one or more parameters of the activity with respect to a common sustainability factor.

Example 12 is the method of example(s) 8-11, further comprising: prior to generating the recommendation, generate a comparison between the sustainability metric and the predicted sustainability state at the subsequent point in time.

Example 13 is the method of example(s) 8-12, wherein the predicted sustainability state comprises a total greenhouse gas emissions in a defined time period, a total water use in the defined time period, or a total chemical wastage in the defined time period.

Example 14 is the method of example(s) 8-13, wherein the recommendation for the at least one action comprises indications of an associated impact of each action of the at least one action on the predicted sustainability state, an associated uncertainty value for the predicted sustainability state for each action of the at least one action, or a contribution of each parameter of the one or more parameters of the activity to the predicted sustainability state.

Example 15 is a non-transitory computer-readable medium comprising instructions that are executable by a processing device for causing the processing device to perform operations comprising: receiving a sustainability target for a level of assessment for a hydrocarbon operation; receiving actual data for an activity associated with the hydrocarbon operation; generating a sustainability metric based on the actual data and one or more parameters of the activity; generating, by at least one algorithm, a predicted sustainability state for the level of assessment at a subsequent point in time based on the sustainability metric, the actual data, and the one or more parameters of the activity; generating a recommendation for at least one action based on the predicted sustainability state and the sustainability target for the hydrocarbon operation; and outputting the recommendation for the at least one action for adjusting the activity of the hydrocarbon operation.

Example 16 is the non-transitory computer-readable medium of example 15, further comprising instructions executable by the processing device for causing the processing device to perform operations comprising: receiving a selection of an action of the at least one action; and performing the action for the hydrocarbon operation.

Example 17 is the non-transitory computer-readable medium of example 16, further comprising instructions executable by the processing device for causing the processing device to perform operations comprising: in response to performing the action for the hydrocarbon operation, receiving real-time data associated with the action; generating an updated sustainability metric based on the real-time data and the one or more parameters of the activity; and generating an updated predicted sustainability state for the level of assessment at the subsequent point in time based on the updated sustainability metric, the real-time data, and the one or more parameters of the activity.

Example 18 is the non-transitory computer-readable medium of example(s) 15-17, further comprising instructions executable by the processing device for causing the processing device to generate the sustainability metric by: analyzing the actual data and the one or more parameters of the activity with respect to a common sustainability factor.

Example 19 is the non-transitory computer-readable medium of example(s) 15-18, further comprising instructions executable by the processing device for causing the processing device to perform operations comprising: prior to generating the recommendation, generating a comparison between the sustainability metric and the predicted sustainability state at the subsequent point in time.

Example 20 is the non-transitory computer-readable medium of example 5-19, wherein the recommendation for the at least one action comprises indications of an associated impact of each action of the at least one action on the predicted sustainability state, an associated uncertainty value for the predicted sustainability state for each action of the at least one action, or a contribution of each parameter of the one or more parameters of the activity to the predicted sustainability state.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and a memory device that includes instructions executable by the processing device for causing the processing device to:
   receive a sustainability target for a level of assessment for a hydrocarbon production operation which includes multiple hydrocarbon assets;
   receive operational data for an activity associated with the hydrocarbon production operation via sensor networks deployed at the multiple hydrocarbon assets;
   generate a sustainability metric based in substantially real-time directly from the operational data and one or more parameters of the activity which indicate the type of energy source and equipment used for the activity using computational algorithms that process sensor measurements of physical parameters including temperature, pressure, flow rates, and chemical compositions;
   generate, by at least one forecasting algorithm, a predicted sustainability state for the level of assessment at a subsequent point in time based on the sustainability metric, the operational data, and the one or more parameters of the activity, wherein the forecasting algorithm includes a machine learning model trained on historical data relating to hydrocarbon assets that are similar to the multiple hydrocarbon assets and wherein the machine learning model automatically adjusts weighting coefficients based on real-time feedback from physical monitoring systems;
   generate a recommendation for at least one activity based on the predicted sustainability state and the sustainability target for the hydrocarbon operation wherein the recommendation includes specific equipment configuration changes and operational parameter adjustments;
   determine adjusted parameters of the at least one activity to thereby change sustainability performance of the hydrocarbon production operation to be more sustainable;
   execute the at least one activity using the adjusted parameters by automatically controlling physical equipment at the hydrocarbon production operation;
   recording changes to the sustainability performance of the hydrocarbon operation through continuous monitoring of physical system outputs; and
   adjusting the forecasting algorithm based on the changes to the sustainability performance of the hydrocarbon operation.

2. The system of claim 1, wherein the memory device further includes instructions executable by the processing device for causing the processing device to:
   receive a selection of an activity of the at least one activity; and
   perform the selected activity for the hydrocarbon production operation.

3. The system of claim 2, wherein the memory device further includes instructions executable by the processing device for causing the processing device to:
   in response to performing the activity for the hydrocarbon production operation, receive real-time data associated with the action;
   generate an updated sustainability metric based on the real-time data and the one or more parameters of the activity; and
   generate an updated predicted sustainability state for the level of assessment at the subsequent point in time based on the updated sustainability metric, the realtime data, and the one or more parameters of the activity.

4. The system of claim 1, wherein the memory device further includes instructions executable by the processing device for causing the processing device to generate the sustainability metric by:

analyzing the operational data and the one or more parameters of the activity with respect to a common sustainability factor.

5. The system of claim 1, wherein the memory device further includes instructions executable by the processing device for causing the processing device to:

prior to generating the recommendation, generate a comparison between the sustainability metric and the predicted sustainability state at the subsequent point in time.

6. The system of claim 1, wherein the predicted sustainability state comprises a total greenhouse gas emissions in a defined time period, a total water use in the defined time period, or a total chemical wastage in the defined time period.

7. The system of claim 1, wherein the recommendation for the at least one action comprises indications of an associated impact of each action of the at least one action on the predicted sustainability state, an associated uncertainty value for the predicted sustainability state for each action of the at least one action, or a contribution of each parameter of the one or more parameters of the activity to the predicted sustainability state.

8. Non-transitory computer-readable media comprising instructions that are executable by a processing device for causing the processing device to perform operations comprising:

receive a sustainability target for a level of assessment for a hydrocarbon production operation which includes multiple hydrocarbon assets;

receive operational data for an activity associated with the hydrocarbon production operation via sensor networks deployed at the multiple hydrocarbon assets;

generate a sustainability metric based in substantially real-time directly from the operational data and one or more parameters of the activity which indicate the type of energy source and equipment used for the activity using computational algorithms that process sensor measurements of physical parameters including temperature, pressure, flow rates, and chemical compositions;

generate, by at least one forecasting algorithm, a predicted sustainability state for the level of assessment at a subsequent point in time based on the sustainability metric, the operational data, and the one or more parameters of the activity, wherein the forecasting algorithm includes a machine learning model trained on historical data relating to hydrocarbon assets that are similar to the multiple hydrocarbon assets and wherein the machine learning model automatically adjusts weighting coefficients based on real-time feedback from physical monitoring systems;

generate a recommendation for at least one activity based on the predicted sustainability state and the sustainability target for the hydrocarbon operation, wherein the recommendation includes specific equipment configuration changes and operational parameter adjustments;

determine adjusted parameters of the at least one activity to thereby change sustainability performance of the hydrocarbon production operation to be more sustainable;

execute the at least one activity using the adjusted parameters by automatically controlling physical equipment at the hydrocarbon production operation;

recording changes to the sustainability performance of the hydrocarbon operation through continuous monitoring of physical system outputs; and adjusting the forecasting algorithm based on the changes to the sustainability performance of the hydrocarbon operation.

9. The non-transitory computer-readable media of claim 8, wherein the operations further comprise:

receive a selection of an activity of the at least one activity; and perform the selected activity for the hydrocarbon production operation.

10. The non-transitory computer-readable media of claim 9, wherein the operations further comprise:

in response to performing the activity for the hydrocarbon production operation, receive real-time data associated with the action;

generate an updated sustainability metric based on the real-time data and the one or more parameters of the activity; and generate an updated predicted sustainability state for the level of assessment at the subsequent point in time based on the updated sustainability metric, the realtime data, and the one or more parameters of the activity.

11. The non-transitory computer-readable media claim 8, wherein the operations further comprise:

analyzing the operational data and the one or more parameters of the activity with respect to a common sustainability factor.

12. The non-transitory computer-readable media of claim 8, wherein the operations further comprise:

prior to generating the recommendation, generate a comparison between the sustainability metric and the predicted sustainability state at the subsequent point in time.

13. The non-transitory computer-readable media of claim 8, wherein the predicted sustainability state comprises a total greenhouse gas emissions in a defined time period, a total water use in the defined time period, or a total chemical wastage in the defined time period.

14. The non-transitory computer-readable media of claim 8, wherein the recommendation for the at least one action comprises indications of an associated impact of each action of the at least one action on the predicted sustainability state, an associated uncertainty value for the predicted sustainability state for each action of the at least one action, or a contribution of each parameter of the one or more parameters of the activity to the predicted sustainability state.

\* \* \* \* \*